Aug. 9, 1955   A. D. ALLMAN   2,714,717
GLARE SHIELD AND ALTERNATE EYE SHADE FOR SPECTACLES
Filed June 1, 1954

*INVENTOR.*
ARVEL D. ALLMAN
BY
*Marvin B. Davis*
ATTORNEY.

United States Patent Office 2,714,717
Patented Aug. 9, 1955

2,714,717
GLARE SHIELD AND ALTERNATE EYE SHADE FOR SPECTACLES

Arvel D. Allman, Kansas City, Mo., assignor of one-half to Birt Bourret, Kansas City, Mo.

Application June 1, 1954, Serial No. 433,386

3 Claims. (Cl. 2—13)

This invention relates to an improvement in a glare shield and alternate eye shade for spectacles and more particularly to the novel and economical structure thereof.

Heretofore the sunglare shields and eye shades for attachment to spectacles have a pair of spaced hinges thereon with a means of attachment to the spectacles.

An object of the present invention is to provide a light weight simple and novel structure having a single means of fastening to the nose bridge of the glare shield and alternate eye shade, and an elongated member having a round section formed with hooks as a means of clipping on the glasses. This structure has a greater merit than any of the other glare shields and eye shades heretofore used, is less noticeable to other persons and can be placed in the same usual case with the spectacles.

With this object in view the invention will be more fully understood from the accompanying drawing, the following specification and the scope of the claims appended.

Figure 1:
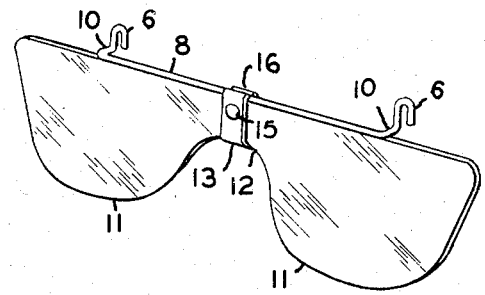
Figure 1 is a perspective view of the improved glare shield and alternate eye shade.

The spectacles 5 may be of any general design and receive the clip-on hooks 6 as a means of attachment over the lens rims 7.

The clip-on hooks 6 are formed transverse to a round elongated member 8, preferably spaced to the average centers of the lenses 9, and are spaced from the round elongated member 8 by offset wires 10 connected thereto.

The glare shields and alternate eye shades 11 are made to cover the front of both lenses 9 and are joined by a nose bridge 12 preferably all formed together in one piece.

A pair of flat bars 13 are centrally placed flatwise on opposite sides of the nose bridge 12, and are secured thereto by rivet 15. The elongated member 8 has a round section placed against the upper edge of the glare shield and alternate eye shaes 11 in a parallel relation thereto. The upper ends of the flat bars 13 project above the nose bridge 12, elongated member 8, and are turned toward each other at 16 to frictionally hold the round elongated member 8 in any manually rotated position desired.

It is obvious that the hooks 6 may be attached to any make of spectacles, the offset wires 10 project outwardly to space the round elongated member in front of the lenses and the flat bars 13 hold the nose bridge 12 with the glare shields and alternate eye shades against the round elongated member 8 by having the upper ends 16 turned toward each other.

Figure 2:
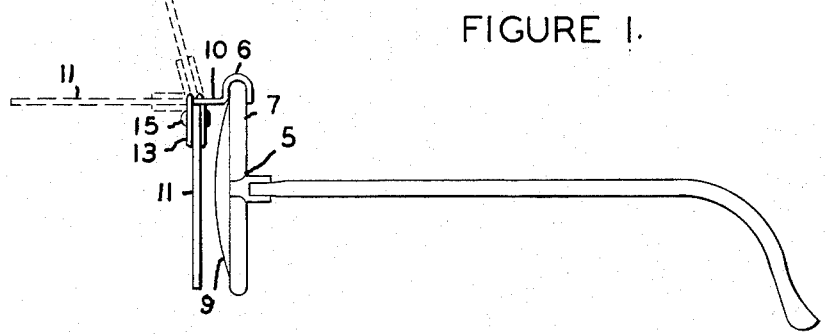
Figure 2 is an end view of the improved glare shield and alternate eye shade, the glare shield being shown in solid lines in front of the spectacles, the eye shade being illustrated in long dash lines in horizontal position, and the glare shield and alternate eye shade being illustrated in an elevated position when not otherwise used by short dash lines.
Figure 3:
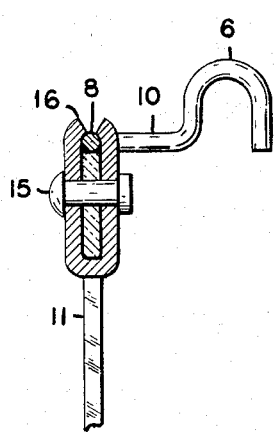
Figure 3 is an enlarged transverse fragmentary broken view illustrating the flat bar attachment to the shield and round elongated member, and one hook for attachment to the spectacles.
Figure 4:
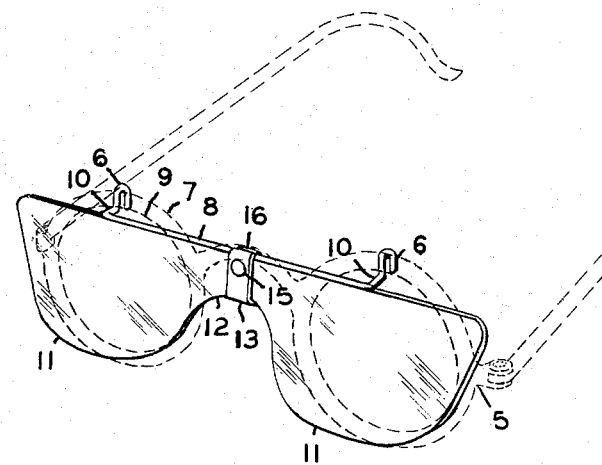
Figure 4 is a perspective view similar to Figure 1 with the addition of the spectacles illustrated in short dash lines.

If glare shields are required the members 11 are turned downward and spaced in front of the lenses 9 as illustrated in solid lines in Figure 2.

If eye shades are required the members 11 are turned toward a horizontal position as illustrated by long dash lines in Figure 2.

When it is desired to see through the spectacles without the physical use of the glare shields and alternate eye shades 11 the members 11 are raised upward as indicated by short dotted lines in Figure 2.

What I claim as new and desire to secure by Letters Patent, is:

1. A glare shield and alternate eye shade having an attachment for spectacles comprising, a plastic glare shield for both eyes including a nose bridge portion all formed in one piece, an elongated member having a round section, the diameter of the round section of said elongated member and the thickness of said plastic glare shield being substantially the same, said elongated member being located along the upper edge of said plastic glare shield, a hook shaped member being formed on each end of said elongated member for attachment to spectacles, said hook shaped members being formed transverse to said elongated member, a pair of flat bars, said pair of flat bars being placed flatwise on opposite sides of the nose bridge of said plastic glare shield, a rivet, said rivet securing said pair of flat bars to the nose bridge, the upper ends of said flat bars being projected above the nose shield and elongated member and inclined toward each other to frictionally hold said elongated member in any manually rotated position.

2. A glare shield and alternate eye shade having an attachment for spectacles comprising, a plastic glare shield for both eyes including a nose bridge portion, an elongated member having a round section, the diameter of the round section of said elongated member and the thickness of said plastic glare shield being substantially the same, said elongated member being located along the upper edge of said plastic glare shield, a means on each end of said elongated member for attachment to spectacles, a pair of flat bars, said pair of flat bars being placed flatwise on opposite sides of the nose bridge of said plastic glare shield, means securing said pair of flat bars to the nose bridge, the upper ends of said flat bars being projected above the nose shield and elongated member and inclined toward each other to frictionally hold said elongated member in any manually rotated position.

3. A glare shield and alternate eye shade having an attachment for spectacles comprising, a plastic glare shield for both eyes, an elongated member having a round section, the diameter of the round section of said elongated member and the thickness of said plastic glare shield being substantially the same, said elongated member being located along the upper edge of said plastic glare shield, a hook member being formed on each end of said elongated member for attachment to spectacles, said hook shaped members being formed transverse to said elongated member, a pair of flat bars, said pair of flat bars being centrally placed flatwise on opposite sides of said plastic glare shield means, said means securing said pair of flat bars to said plastic glare shield, the upper ends of said flat bars being projected above the glare shield and elongated member and inclined toward each other to frictionally hold said elongated member in any manually rotated position.

References Cited in the file of this patent

UNITED STATES PATENTS 2,668,952   Kobashikawa _____ Feb. 16, 1954

FOREIGN PATENTS 305,513   Great Britain _____ Feb. 6, 1929